(12) United States Patent
Wenzel et al.

(10) Patent No.: US 11,267,189 B2
(45) Date of Patent: Mar. 8, 2022

(54) MANDREL AND SUPPORT ASSEMBLY

(71) Applicants: DOW GLOBAL TECHNOLOGIES LLC, Midland, MI (US); ROHM AND HAAS COMPANY, Philadelphia, PA (US)

(72) Inventors: Jeffrey D. Wenzel, Midland, MI (US); Michael T. Petr, Collegeville, PA (US); Mark Mirgon, Midland, MI (US); Jay M. Tudor, Goodrich, MI (US); Sam L. Crabtree, Lake Jackson, TX (US); Jie Feng, Midland, MI (US)

(73) Assignees: Dow Global Technologies, LLC, Midland, MI (US); Rohm and Haas Company, Philadelphia, PA (US)

( * ) Notice: Subject to any disclaimer, the term of this patent is extended or adjusted under 35 U.S.C. 154(b) by 546 days.

(21) Appl. No.: 16/302,907

(22) PCT Filed: May 23, 2017

(86) PCT No.: PCT/US2017/033927
§ 371 (c)(1),
(2) Date: Nov. 19, 2018

(87) PCT Pub. No.: WO2017/205327
PCT Pub. Date: Nov. 30, 2017

(65) Prior Publication Data
US 2019/0275729 A1    Sep. 12, 2019

Related U.S. Application Data

(60) Provisional application No. 62/341,900, filed on May 26, 2016.

(51) Int. Cl.
*B29C 57/04* (2006.01)

(52) U.S. Cl.
CPC ................................. *B29C 57/04* (2013.01)

(58) Field of Classification Search
CPC ........ B29C 57/04; B29D 23/00; B21D 26/033
See application file for complete search history.

(56) References Cited

U.S. PATENT DOCUMENTS 3,030,901 A * 4/1962 McConnell .......... B21D 26/033
72/31.06
3,358,488 A  12/1967 Fuchs
3,570,065 A * 3/1971 Guerrero ................ B29C 57/04
425/393
3,632,732 A * 1/1972 Osterhagen .............. B29D 1/00
264/312

(Continued)

FOREIGN PATENT DOCUMENTS

CN    101670664 B    7/2012
CN    103358423 A    10/2013

(Continued)

*Primary Examiner* — Jacob T Minskey
*Assistant Examiner* — Virak Nguon
(74) *Attorney, Agent, or Firm* — Brian L. Mutschler

(57) ABSTRACT

An apparatus comprising: (a) a mandrel; (b) an internal guide spaced apart from the mandrel; (c) an external guide extending around all or a portion of the internal guide and being spaced apart from the mandrel; wherein a pipe extends between the internal guide and the external guide and then over the mandrel so that the mandrel changes one or more dimensions of the pipe.

18 Claims, 4 Drawing Sheets

(56) References Cited

U.S. PATENT DOCUMENTS

| | | | |
|---|---|---|---|
| 3,845,184 A | 10/1974 | Nackaerts | |
| 3,857,666 A * | 12/1974 | Barnett | B29C 57/04 |
| | | | 425/393 |
| 3,980,746 A | 9/1976 | Carrow | |
| 4,065,242 A | 12/1977 | Dickey et al. | |
| 4,499,045 A | 2/1985 | Osborner | |
| 4,632,656 A * | 12/1986 | Eygelaar | B29C 55/26 |
| | | | 425/529 |
| 5,449,487 A | 9/1995 | Jarvenkyla | |
| 6,135,749 A | 10/2000 | Kakadian et al. | |
| 7,069,635 B2 * | 7/2006 | van Lenthe | B29C 57/02 |
| | | | 29/447 |
| 8,656,749 B2 | 2/2014 | Baba | |
| 9,038,258 B2 | 5/2015 | Liao et al. | |
| 9,707,614 B2 | 7/2017 | Katsumura et al. | |
| 2006/0000291 A1 * | 1/2006 | Podhorsky | B21D 39/20 |
| | | | 73/837 |
| 2018/0345349 A1 * | 12/2018 | Svedberg | B21D 41/026 |

FOREIGN PATENT DOCUMENTS

| | | |
|---|---|---|
| CN | 103395183 A | 11/2013 |
| CN | 103568314 A | 2/2014 |
| CN | 104149354 A | 11/2014 |
| CN | 203994736 U | 12/2014 |
| CN | 104530593 A | 4/2015 |
| DE | 3126553 A1 | 1/1983 |
| DE | 3243140 A1 | 8/1984 |
| JP | 56-011116 A | 4/1981 |
| JP | 2001/105060 A | 4/2001 |
| JP | 3504967 B2 | 3/2004 |
| JP | 5163764 B2 | 3/2013 |
| JP | 2013/086122 A | 5/2013 |
| JP | 5644577 B2 | 12/2014 |
| JP | 2015/100829 A | 6/2015 |
| SU | 1496873 A1 | 7/1989 |
| SU | 1625556 A1 | 2/1991 |
| WO | 97/10941 A1 | 3/1997 |
| WO | 2009/049374 A1 | 4/2009 |

* cited by examiner

MANDREL AND SUPPORT ASSEMBLY

FIELD

The present teachings generally relate to a mandrel and assembly to assist in moving a pipe over the mandrel and, more specifically, a mandrel design and assembly that supports a pipe to reduce pipe buckling during expansion startup.

BACKGROUND

Typically, plastic pipes are created by extruding plastic material so that a continuous length pipe is created. As a specified length of pipe is created, sections of pipe are cut from the continuous pipe. The material of the pipe may be oriented during manufacture by passing the pipe over a mandrel that expands the diameter of the pipe. Examples of may be found in U.S. Pat. Nos. 3,358,488 and 5,449,487, both of which are incorporated by reference herein for all purposes. Some other systems expand the pipe by applying a fluid pressure within the pipe so that the pipe expands outward and increases in diameter. Examples may be found in U.S. Pat. Nos. 4,499,045; 4,632,656; and 9,038,258.

It would be attractive to have an assembly that continuously expands a pipe and orients the pipe. It would be attractive to have an assembly that supports a pipe to be expanded so that the pipe expands over a mandrel without buckling or being damaged during startup. It would be attractive to have an assembly that supports a pipe that is being moved by a force being applied from one end to move the pipe over a mandrel. What is needed is an assembly that supports a pipe when a pushing force is being applied to the pipe and the pushing force is opposed. It would be attractive to have a support assembly that supports an inside of a pipe and an outside of a pipe before the pipe is moved into contact with a mandrel. What is needed is a support assembly that expands a pipe as the pipe comes into contact with a mandrel.

SUMMARY

The present teachings meet one or more of the present needs by providing: an apparatus comprising: (a) a mandrel; (b) an internal guide spaced apart from the mandrel; (c) an external guide extending around all or a portion of the internal guide and being spaced apart from the mandrel; wherein a pipe extends between the internal guide and the external guide and then over the mandrel so that the mandrel changes one or more dimensions of the pipe.

The present teachings provide an assembly that continuously expands a pipe and orients the pipe. The present teachings provide an assembly that supports a pipe to be expanded so that the pipe expands over a mandrel without buckling or being damaged during startup. The present teachings provide an assembly that supports a pipe that is being moved by a force being applied from one end to move the pipe over a mandrel. The present teachings provide a support assembly that supports a pipe when a pushing force is being applied to the pipe and the pushing force is opposed. The present teachings provide a support assembly that supports an inside of a pipe and an outside of a pipe before the pipe is moved into contact with a mandrel. The present teachings provide a support assembly that expands a pipe as the pipe comes into contact with a mandrel.

DETAILED DESCRIPTION

Figure 1:
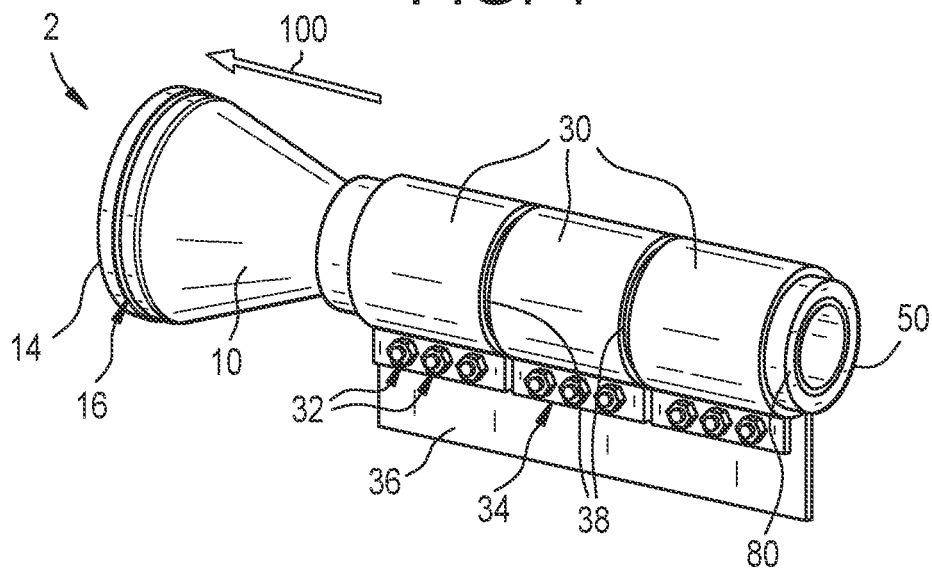
FIG. 1 illustrates a perspective view of an assembly.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide an assembly that assists in increasing a diameter of a pipe, orienting the material within the pipe, or both. The assembly functions to guide and support a pipe as the pipe is moved into contact with and over a mandrel. The assembly functions to provide lateral support, radial support, or both relative to a length of a pipe as the pipe is longitudinally moved from one end, from a single drive, or both. The assembly functions to prevent deformation of the pipe as the pipe is moved into contact with the mandrel and is fed over the mandrel. The assembly may longitudinally move a pipe into contact with a mandrel and over the mandrel (i.e., may push the pipe). The assembly may move the pipe once the pipe is moved over the mandrel (i.e., may pull the pipe). The assembly may include a mandrel, an external guide, an internal guide, or a combination thereof that assists in feeding a pipe over a mandrel so that the pipe is stretched, oriented, or both.

The mandrel may function to stretch a pipe, orient the pipe, orient molecules within the pipe, or a combination thereof. The mandrel may be sufficiently strong so that, as a pipe is moved over the mandrel, the pipe is expanded, oriented, or both. The mandrel may be solid, hollow, solid walls with a hollow center, include pipes, be fluid filled, or a combination thereof. The mandrel may be conically shaped. The mandrel may have a continuous slope from a beginning to an end. The mandrel may have one or more slope changes along a length of the mandrel. The mandrel may be radially expandable so that a cross-sectional length (e.g., diameter) of the mandrel may be varied. Preferably, the mandrel is solid and each mandrel produces a specific cross-sectional length (i.e., diameter). The mandrel has a leading portion and a trailing portion. The leading portion is a part of the mandrel that a pipe comes into contact with first. The trailing portion is a part of the mandrel that a pipe comes into contact with last as the pipe exits the mandrel. The leading portion may be solid. The leading portion may come to a point. The leading portion may be open. One or more mandrel pipes may extend through the leading portion of the mandrel. The leading portion may support and/or be supported by an internal guide, an external guide, or both. The one or more mandrel pipes may fluidly connect the mandrel with an external guide, an internal guide, or both.

The one or more mandrel pipes may function to provide fluid through the assembly, the mandrel, or both. The one or more mandrel pipes may function to remove fluid or allow fluid to move out of the external guide, the internal guide, or both. The one or more mandrel pipes may permit movement of fluid through the mandrel. The mandrel pipe may extend from a leading portion to a trailing portion of the mandrel. The mandrel pipe may connect to an adapter, an internal guide pipe, a pressure plug, or a combination thereof. The mandrel pipe may be a pipe that extends through the mandrel. The mandrel pipe may be an opening within the mandrel. The mandrel pipe may be an absence of material within the mandrel so that fluid (e.g., air, water, or lubricant) may pass through the assembly and the mandrel. The mandrel pipe may create an opening in the trailing portion of the mandrel so that fluid can exit the mandrel.

The mandrel plug may function to partially or fully restrict a flow of fluid out of the mandrel, the mandrel pipe, or both. The mandrel plug may function to control pressure in the mandrel, the external guide, the internal guide, or a combination thereof. The mandrel plug may control a volume of fluid through the mandrel, the external guide, the internal guide, or a combination thereof. The mandrel plug may guide fluid out of the mandrel. Preferably, the fluid guided through the mandrel plug is heated water. The mandrel plug may be solid so that a direction of flow of the fluid is changed when the fluid contacts the mandrel plug. The mandrel plug may include one or more through holes. The mandrel plug may include a plurality of through holes. The mandrel plug may be connected to an adapter, an internal guide pipe, internal tube, or a combination thereof. The mandrel plug may form a friction fit with the mandrel. The mandrel plug may be connected to the mandrel by a fastener (e.g., screw, nail, rivet, threaded member, pipe, or weld). The mandrel plug may include sealing or seals (e.g., gasket, o-ring, seals, washers, sealing compound). The mandrel plug may lock to the mandrel and be free of adjustment or movement relative to the mandrel. The mandrel plug may be movable relative to the mandrel so that a gap between the mandrel and the mandrel plug may be varied. The mandrel plug may determine a gap that is located between the mandrel and the mandrel plug. The gap may be sufficiently small so that a desired pressure, temperature, or both are maintained within the external guide, internal guide, or both. The gap may be sufficiently large so that fluid exits the mandrel, external guide, internal guide, or a combination thereof to maintain a pressure and/or temperature within the external guide, internal guide, or both. The gap may be about 0.5 mm or more, about 1 mm or more, about 2 mm or more, about 5 mm or more. The gap may be about 5 cm or less, about 3 cm or less, or about 1 cm or less. The gap may control fluid flow through the internal guide.

The internal guide may function to provide support to inner walls of the pipe. The internal guide may function to guide fluid through the pipe to the mandrel, proximate to the mandrel, out of the pipe, or a combination thereof. The internal guide may function to provide one or more flows of fluid through the pipe. Preferably, the internal guide provides two independent fluid paths through the pipe. More preferably, the internal guide supports inner walls of the pipe and guides two fluid paths through the pipe. The internal guide may be solid. The internal guide may include one or more tubes, one or more pipes, or both that extend there through. The internal guide may include a tube that extends through another tube. The pipe may act as an outer wall of the internal guide. The internal guide may include one or more adapters, one or more pressure plugs, one or more internal guide pipes, one or more seals, one or more internal tubes, one or more external guide pipes, one or more fluid flow paths, or a combination thereof. Preferably, the internal guide includes an adapter at one end.

The adapter may function to form a seal between the mandrel and the internal guide. The adapter may function to seal or form a connection with an internal guide pipe, an external guide pipe or both. The adapter may function to pass one or more fluids out of the internal guide and proximate to the mandrel, through the mandrel, outside of the mandrel, or a combination thereof. The adapter may fully or partially seal the internal guide, the mandrel, the pipe, or a combination thereof. The adapter may include one or more internal tubes. The adapter may include a plurality of internal tubes. Preferably, the one or more internal tubes extend through a center of the adapter. The adapter may include one or more external tubes. Preferably, the adapter includes a plurality of external tubes. More preferably, the plurality of external tubes extends partially or fully around a perimeter region (e.g., inside of a peripheral edge) of the adapter. The external tubes may extend around the internal tubes so that the plurality of external tubes at least partially surrounds the one or more internal tubes. The adapter may be a solid piece. The adapter may be made of one material. The adapter may contact the pipe, and the external guide pipe may be free of contact with the pipe. The adapter may center the pipe over the internal guide. The adapter may be made of two or more materials. The adapter may include pliable portions and non-pliable portions. The adapter may be a standard size depending on the size of a pipe being created, a mandrel, internal guide, external guide, or a combination thereof. The adapter may have an inner portion that is a standard size and an outer portion that may be added to the inner portion to adapt the adapter to an inner diameter of a pipe so that the adapter, internal guide, or both may be used with virtually any sized pipe (e.g., about 6 in (15 mm), about 8 in (20 mm), about 10 in (25 mm), about 12 in (30 mm), about 18 in (45 mm), about 24 in (60 mm), about 36 in (90 mm)). The adapter may be made of or include plastic, metal, a polymer, rubber, an elastomer, a thermoset, a thermoplastic, acrylonitrile butadiene styrene, acrylic, polyethylene terephthalate, polyethylene, polyethylene, stainless steel (e.g., 316, 308), alloy steel, tool steel (e.g., 4140), iron, aluminum, chrome, tungsten, nickel, a metal alloy, or a combination thereof. The adapter may include a coating. The coating may be chrome, polytetrafluoroethylene, anodized, nickel, tungsten, or a combination thereof. The coating may form a bearing surface on the outside of the adapter. The adapter may include a body portion that connects the adapter to an external guide pipe.

The body portion may extend into the internal guide pipe so that a seal is formed between the adapter and the external guide pipe. The body portion may receive the external guide pipe. The body portion may extend around the external guide pipe, extend into the external guide pipe, or both. The body portion may be in contact with the pipe. The body portion may center then internal guide within the pipe. The body portion may include one or more seals that contact the pipe and center the adapter within the pipe. The body portion may be free of contact with the pipe. The body portion may be prevented from contacting the pipe by hydraulic pressure, fluid pressure, or both. The body portion may be centered within the pipe by the mandrel. The body portion may center a neck region with a mandrel. A neck region may extend from the body portion.

The neck region and the body portion may form two portions of the adapter that extend in opposing directions. The neck region may form a connection with a mandrel. An end of the internal guide may be supported from the mandrel by the neck region. The neck region may extend into the mandrel, around the mandrel, or both. The neck region may form a seal with the mandrel. The neck region may guide fluid from the internal guide pipe into the mandrel. The neck region may be adjustable, pliable, elastic, or a combination thereof so that the neck region forms a seal and/or connection with the mandrel. The adapter may be located on an opposite end of an internal guide as a pressure plug.

The pressure plug may function to seal an end of an internal guide so that fluid is sealed within the internal guide. The pressure plug may function to seal or form a connection with an internal guide pipe, an external guide pipe or both. The pressure plug may function to form a seal with a pipe. The pressure plug may center the internal guide within the pipe. The pressure plug may maintain the internal guide within the pipe so that a middle section of the internal guide is free of contact with the pipe. The pressure plug may function to pass one or more fluids into the internal guide. The pressure plug may fully or partially seal the internal guide, the internal guide pipe, the external guide pipe, the pipe, or a combination thereof. The pressure plug may include one or more internal tubes. The pressure plug may include a plurality of internal tubes. Preferably, the one or more internal tubes extend through a center of the pressure plug. The pressure plug may include one or more external tubes. The pressure plug may include a plurality of external tubes. The external tubes may extend around the internal tubes so that the plurality of external tubes at least partially surrounds the one or more external tubes. The one or more external tubes may extend partially or fully around a perimeter region (e.g., inside of a peripheral edge), alongside the internal tubes, substantially parallel to the internal tubes, of the pressure plug. The internal tubes, the external tubes, or both may be a lack of material in the pressure plug, the adapter, or both so that fluid can pass there through. Preferably, the pressure plug includes one internal tube and one external tube. The pressure plug may be a solid piece. The pressure plug may be made of one material. The pressure plug may be made of two or more materials. The adapter may include pliable portions and non-pliable portions. The pressure plug may be a standard size depending on the size of a pipe being created, a mandrel, internal guide, external guide, or a combination thereof. The pressure plug may have an inner portion that is a standard size and an outer portion that may be added to the inner portion to adapt the pressure plug to an inner diameter of a pipe so that the adapter, internal guide, or both may be used with virtually any sized pipe (e.g., about 6 in (15 mm), about 8 in (20 mm), about 10 in (25 mm), about 12 in (30 mm), about 18 in (45 mm), about 24 in (60 mm), about 36 in (90 mm)). The pressure plug may be made of or include plastic, metal, a polymer, rubber, an elastomer, a thermoset, a thermoplastic, acrylonitrile butadiene styrene, acrylic, polyethylene terephthalate, polyethylene, polyethylene, stainless steel e.g., 316, 308), alloy steel, tool steel (e.g., 4140), iron, aluminum, chrome, tungsten, nickel, a metal alloy, or a combination thereof. The pressure plug may include a coating. The coating may be chrome, polytetrafluoroethylene, anodized, nickel, tungsten, or a combination thereof. The coating may form a bearing surface on the outside of the pressure plug. The pressure plug and the adapter may be made of the same material. The pressure plug may include a connection region that connects the pressure plug to an external guide pipe, a connection region that connects the pressure plug to a pipe, seals, or a combination thereof.

The sealing region may function to form a seal with a pipe. The sealing region may function to receive fluid and direct the fluid into an internal tube, an external tube, the internal guide, or a combination thereof. The sealing region may split fluid introduced into the pressure plug. The sealing region may maintain separate fluid paths as pipes are introduced into the pressure plug. The sealing region may be free of seals. Preferably, the sealing region includes one or more seals or a plurality of seals. The one or more seals may contact an internal wall of a pipe and prevent fluid from exiting the internal guide. The one or more seals may form a circumferential seal with an inner wall of a pipe. The one or more seals may extend partially or fully into grooves in the pressure plug. The one or more seals may adapt a standard sized pressure plug to accommodate different sized pipes as is discussed herein. The one or more seals of the sealing region may flex as the pipe is moved towards and over the mandrel. The one or more seals may maintain a seal as the pipe is moved towards the mandrel. The seals may center the internal guide within a pipe. The seals may create a gap or clearance between the internal guide and the pipe so that the internal guide, except for the seals is not in contact with the pipe. The pressure plug, the sealing region, or both may be free of contact with the pipe (i.e., only the one or more seals may contact the pipe). The pressure plug may include a connection region that extends from the sealing region.

The connection region may function to connect the pressure plug to the internal guide, the external guide pipe, or both. The connection region may function to connect an internal tube with an internal guide pipe; an external tube with an external guide pipe; or both. The connection region may seal an end of the internal guide. The connection region may extend into the internal guide, around the internal guide, or both. The connection region may form a friction fit, a threaded connection, or both with an external guide pipe, an internal guide pipe, or both. The connection region may introduce an internal fluid into an internal guide pipe and an external fluid into an external guide pipe.

The one or more internal guide pipes may function to move a fluid through the internal guide to the mandrel. The one or more internal guide pipes may create a fluid path through an external guide pipe, an external fluid, or both. The one or more internal guide pipes may extend from the adapter to the pressure plug. The one or more internal guide pipes may extend from an internal tube in the pressure plug to an internal tube in the adapter. The one or more internal guide pipes may carry a first fluid, a second fluid, a fluid that is different than an external fluid, a fluid in a different direction than the external fluid, or a combination thereof. The one or more internal guide pipes may carry an internal fluid.

The internal fluid may function to heat the pipe, heat the mandrel, create pressure in the internal guide, create pressure in the mandrel, lubricate the mandrel, lubricate the pipe, or a combination thereof. The internal fluid may be provided at a different temperature, rate, volume, location, speed, pressure, or a combination thereof as an external fluid. The internal fluid and the external fluid may be different fluids. The internal fluid may flow through the internal guide and create pressure in the mandrel. The internal fluid may be air or water. Preferably, the internal fluid and the external fluid are both water. The internal fluid may flow through one or more internal tubes as the fluid enters the internal guide, exits the internal guide, or both.

The one or more internal tubes may function to introduce one or more fluids into the internal guide, the mandrel, or both. The one or more internal tubes may function to connect ends of the internal guides, mandrel pipes, create a fluid path through the internal guide, or a combination thereof. The one or more internal tubes may distribute internal fluid within the internal guide. Preferably, at least one of the one or more internal tubes connect to a feed pipe on one side and an internal guide pipe on an opposing side; an internal guide pipe and a mandrel pipe on an opposing side, or both. The one or more internal tubes may provide a fluid path through the adapter, the pressure plug, or both so that fluid is introduced into and passed through the internal guide. The one or more internal tubes may be straight, include one or more bends, or include straight segments and bent segments. The one or more internal tubes may have one or more bends that extends at a 30 degree angle or more, 45 degree angle or more, 60 degree angle or more, or even about 75 degrees or more (i.e., about 90 degrees). The one or more internal tubes may have one or more bends that extend an angle of about 90 degrees or less. The one or more internal tubes may extend through the adapter, the pressure plug, or both proximate to the one or more external tubes.

The one or more external tubes may function to introduce one or more fluids into the internal guide, around the mandrel, or both. The one or more external tubes may function to connect a feed pipe to an external guide pipe. The one or more external tubes may evenly distribute an external fluid around the mandrel. One or more external tubes may extend through the adapter, the pressure plug, or both. Preferably, there is a plurality of external tubes that extends through the adapter. Preferably, there is one external tube that extends through the pressure plug. The pressure plug may include a single external tube that extends into the pressure plug and a plurality of external tubes that extend out of the pressure plug into the external guide pipe. The one or more external tubes may provide a fluid path through the adapter, the pressure plug, or both so that fluid is introduced into and passed through the internal guide. The one or more external tubes may be straight, include one or more bends, or include straight segments and bent segments. The one or more external tubes may have one or more bends that extend at a 30 degree angle or more, 45 degree angle or more, 60 degree angle or more, or even about 75 degrees or more (i.e., about 90 degrees). The one or more external tubes may have one or more bends that extend an angle of about 90 degrees or less. The one or more external tubes may pass through the pressure plug so that an external fluid fills an external guide pipe. The external fluid may pass from an external guide pipe to one or more external tubes in an adapter and then the external fluid may exit the one or more guide pipes of the adapter around the mandrel.

The external guide pipe may function to connect the adapter and the pressure plug. The external guide pipe may function to create a fluid path through the internal guide. The external guide pipe may function to warm the pipe as the pipe passes along the internal guide. The external guide pipe may function apply pressure to the pipe so that the pipe begins to stretch, deform, expand, soften, or a combination thereof. The external guide pipe may surround, extend into, or both the adapter, the pressure plug, or both. The external guide pipe may be radially expandable, deformable, or both. Preferably, the external guide pipe may be solid, non-deformable, or both. The external guide pipe may have a continuous outer diameter from beginning to end. The outer diameter of the external guide pipe may increase as the external guide pipe approaches the adapter, the mandrel, or both. The outer diameter of the external guide pipe may be increased by external fluid, internal fluid, or both. The outer diameter of the external guide pipe may be increased and decreased as the pipe is moved along the internal guide. The outer diameter of the external guide pipe may be increased during start up as a leading end (i.e., the first part of pipe being fed into the assembly) of the pipe travels across the internal guide so that the inner diameter of the leading end is increased to fit around the mandrel. Preferably, the external guide pipe is adjustable in size. More preferably, the external guide pipe has enough rigidity to resist a force of the pipe on the external guide so that the external guide pipe supports an external wall of the pipe. Once the leading end of the pipe is moved over the mandrel, the external guide pipe may decrease in diameter, the hydraulic pressure may be reduced or removed, or both. The external guide pipe may form a seal with the pressure plug, the adapter, or both. The external guide pipe may be in contact with an inner wall of the pipe along a portion of a length of the external guide pipe or an entire length of the external guide pipe. The external guide pipe may contact an inner wall of the pipe during startup, running, or both. The external guide pipe may be free of contact with an inner wall of the pipe during startup, running, or both. The external guide pipe may be made of or include a plastic, metal, a polymer, rubber, an elastomer, a thermoset, a thermoplastic, acrylonitrile butadiene styrene, acrylic, polyethylene terephthalate, polyethylene, polyethylene, stainless steel (e.g., 316, 308), alloy steel, tool steel (e.g., 4140), iron, aluminum, chrome, tungsten, nickel, a metal alloy, or a combination thereof. The external guide pipe may include a coating. The coating may be chrome, polytetrafluoroethylene, anodized, nickel, tungsten, or a combination thereof. The coating may form a bearing surface on the outside of the external guide or the external guide pipe. The external guide pipe may include flexible regions and reinforcing regions. The external guide pipe may be filled with external fluid, internal fluid, or both. Preferably, the external guide pipe is filled with external fluid and internal fluid passes through the external guide pipe in an internal guide pipe.

The external fluid may function to expand the pipe, lubricate a mandrel, heat the pipe, heat the external guide pipe, apply hydraulic pressure, or a combination thereof. A pressure of the external fluid may be increased or decreased. The pressure of the external fluid may be increased during a startup so that the external guide pipe is moved into contact with an inner wall of the pipe. The external fluid, the internal fluid, or both may be at a pressure of about 0.05 MPa or more, about 0.07 MPa or more, about 0.1 MPa or more, about 0.2 MPa or more, about 0.3 MPa or more, about 0.4 MPa or more, about 0.5 MPa or more, about 0.6 MPa or more, or about 0.7 MPa or more. The external fluid, the internal fluid, or both may be at a pressure of about 2.0 MPa or less, about 1.5 MPa or less, about 1.4 MPa or less, about 1.3 MPa or less, about 1.2 MPa or less, or about 1.1 MPa or less. The external fluid may be air, water, or a lubricant. The external fluid may expand the external guide pipe so that the external guide pipe stretches the pipe and the pipe expands towards an external guide or into contact with an external guide.

The external guide may function to support an outside of a pipe. Preferably, the external guide functions to support an outside of a pipe as the pipe is moved over a mandrel and stretched. The external guide may be free of contact with the pipe and the pipe may be self-supported. The external guide may function to restrict expansion of the pipe upstream of the pipe so that the pipe is free of expansion, buckling, or both before the pipe reaches the mandrel. The external guide has an inner wall that is located proximate to the outer wall of the pipe. The inner wall may be movable relative to the outer wall of the pipe. The inner wall may be static and the outer wall of the pipe may be moved relative to the inner wall of the external guide. The inner wall of the external guide may prevent expansion, buckling, or both of the pipe. The inner wall may be free of contact with the pipe. The inner wall of the external guide may only contact the outer wall of the pipe during start up. The external guide may be made of a solid material, flexible material, or may include both. The external guide may be made of or include plastic, metal, a polymer, rubber, an elastomer, a thermoset, a thermoplastic, acrylonitrile butadiene styrene, acrylic, polyethylene terephthalate, polyethylene, polyethylene, stainless steel (e.g., 316, 308), alloy steel, tool steel (e.g., 4140), iron, aluminum, chrome, tungsten, nickel, a metal alloy, or a combination thereof. The external guide may include a coating. The coating may be chrome, polytetrafluoroethylene, anodized, nickel, tungsten, or a combination thereof. The coating may form a bearing surface on the outside of the external guide. The external guide may be one solid piece. The external guide may include one or more segments and preferably a plurality of segments.

The one or more segments function to allow the external guide to move relative to a pipe as the pipe is extended through the external guide. The one or more segments function to allow the external guide to flex with the pipe. The external guide preferably includes a plurality of segments (e.g., two or more or three or more). Each of the plurality of segments may be in direct contact with the adjacent segments. Each of the segments may be connected together by a solid or flexible piece. The one or more segments may be free of movement as the pipe passes through the external guide. The one or more segments may contact the external guide when the internal guide is expanded outward (e.g., radially expanded outward); during a startup; during a leading end extending over the mandrel; or a combination thereof. The one or more segments may be three segments that are located in series. Each of the segments may be shaped to be complementary in shape to the pipe. Each segment may be generally circular. Each segment may be a continuous ring, a toroid, or both. Each segment may be a ring with a first end and a second end that are proximate to each other but not connected with a circular body portion extending between the first end and the second end. The first end and the second end may be movable relative to each other so that the body portion of the ring is radially expandable (i.e., an internal dimension is increased or decreased as the first end and second end are moved relative to each other). A connection plate may extend from the first end and the second end of each segment and one or more fasteners may extend through each connection plate to connect the connection plate to a machine, stand, mounting plate, or a combination thereof. Each segment may be made of or include metal, a plastic, a fiber reinforced plastic, steel, iron, stainless steel, aluminum, brass, chrome, an alloy of metals taught herein, a thermoset, a thermoplastic, or a combination thereof. Each segment may include a coating. The coating may be chrome, polytetrafluoroethylene, anodized, nickel, tungsten, or a combination thereof. The coating may form a bearing surface on the outside of the segments. Each segment may be a solid ring. Each segment may be a ring that includes one or more pivots, flexible regions, or both. Each of the plurality of segments may be spaced apart from the adjacent segments so that an external guide gap (i.e., space) is located between each of the segments.

The one or more external guide gaps may be located between each segment. The external guide gaps may function to permit some movement of each segment relative to the adjacent segments. The external guide gaps may function to facilitate a leading end of a pipe extending between the external guide and the internal guide. The segments may be free of gaps (i.e., each segment may be touching). The external guide gaps may be about 1 mm or more, about 2 mm or more, about 3 mm or more, about 5 mm or more, about 1 cm or more, or about 5 cm or more. The external guide gaps may be about 20 cm or less, about 15 cm or less, about 10 cm or less, or about 5 cm or less. The external guide gap may be located between each of the one or more connection devices, the each of the one or more mounting plates, or both.

The one or more connection devices function to connect the external guide to a machine a stand, or both. The one or more connection devices may function to connect the entire assembly to a machine, a stand, or both. The connection devices may connect the external guide, the assembly, or both to a mounting plate. The connection devices may form a fixed connection so that the assembly, the connection guide, or both are held static once mounted. The connection devices may allow the external guide to move such that the external guide may expand. Preferably, the connection devices maintain the external guide in a fixed position and prevent radial movement, longitudinal movement, or both of the external guide. Each segment of the external guide may be held on by one or more connection devices and preferably a plurality of connection devices. The connection devices may extend through a connection plate on a first end, a second end, or both ends of the segments. The connection devices may extend through the connection plate on the first end, the connection blade on the second end, and a mounting plate. The connection devices may be a fastener. The connection devices may be a screw, nail, nut, bolt, threaded member, rivet, a mechanical fastener, or a combination thereof. Preferably, the connection devices connect the external guide to a mounting plate that is part of the assembly, the machine, a stand, or a combination thereof.

The one or more mounting plates may function to connect the external guide within the assembly, a machine, a stand, or a combination thereof. The one or more mounting plates may be part of the assembly, the external guide, the machine, or a stand. The one or more mounting plates may include apertures, through holes, or both to connect the external guide within the machine. The one or more mounting plates may be fixed so that the external guide is fixed within the machine. The one or more mounting plates may be movable so that the mounting plates may move the external guide, the assembly, or both within the machine, along the machine, along the internal guide, or a combination thereof.

The internal guide, the external guide, or both may have an end that is located proximate to the mandrel. The internal guide, the external guide, or both may have a space between a respective end and the mandrel. The space may be sufficiently large so that the pipe may fit between the mandrel and the external guide, the internal guide, or both. The space may be sufficiently small so that the external guide, the internal guide, or both support the pipe as the pipe is being moved along the mandrel, the pipe is being expanded, or both. The space between the mandrel and the external guide and the space between the mandrel and the internal guide may be substantially the same or may be different. For example, the external guide may be located about 25 mm from the mandrel and the internal guide may be about 50 mm from the mandrel. The space between the internal guide, the external guide, or both and the mandrel may be about 5 mm or more, about 7 mm or more, about 10 mm or more, about 15 mm or more, about 20 mm or more, about 30 mm or more, or even about 40 mm or more. The space between the internal guide, the external guide, or both and the mandrel may be about 200 mm or less, about 100 mm or less, about 75 mm or less, or about 50 mm or less. The space between the mandrel and the internal guide, the external guide, or both may be determined by the wall thickness of the pipe. The space may be $1/16$ or more, $1/8$ or more, $1/4$ or more, or even about $1/2$ or more the wall thickness of the pipe. The space may be greater than the wall thickness of the pipe, about the same thickness as the pipe or about $3/4$ the thickness of the pipe or less. Preferably, the thickness of the space is about $1/2$ the wall thickness of the pipe or less. The internal guide and external guide may be located a distance apart.

The clearance (i.e., distance) between the internal guide and external guide may be substantially the same as the thickness of the pipe. The assembly may have a total clearance which is the total distance from an external wall of the internal guide to the internal wall of the external guide minus the thickness of the pipe. The total clearance may be a sum of the internal clearance and the external clearance. The clearance between the internal guide and external guide may be substantially equal all of the way around the outside of the internal guide and the inside of the external guide (i.e., the internal guide and external guide may be concentric). The clearance between the internal guide and external guide may be eccentric. For example, the internal guide may be shifted in one direction relative to the external guide. The pipe may be evenly spaced between the internal guide and the external guide. The clearance between the pipe and the internal guide and the pipe and the external guide may be different. The clearance between the pipe and the internal guide and the pipe and the external guide may be a clearance such that the internal guide and pipe are in contact, the internal guide and the pipe are not in contact, the external guide and pipe are in contact, the external guide and the pipe are not in contact, or a combination thereof. The clearance may vary from segment to segment. The clearance may gradually reduce in the segments as the segments get closer to the mandrel. The clearance may increase in the segments as the segments get closer to the mandrel. For example, if the external guide had three segments, the first segment may have a clearance of 3 mm, the second segment may have a clearance of 2 mm, and the third segment, which is closest to the mandrel, may have a clearance of 1 mm. The clearance between an inner wall of the external guide and external wall of the pipe, the external wall of the internal guide and the internal wall of the pipe, or both may be about 0 mm, about 0.5 mm or more, about 1 mm or more, about 2.0 mm or more, about 3.0 mm or more, or even about 5.0 mm or more. The clearance between an inner wall of the external guide and external wall of the pipe, the external wall of the internal guide and the internal wall of the pipe, or both may be about 20 mm or less, about 15 mm or less, or about 10 mm or less. The clearance between the pipe and the internal guide, the external guide, or both may be determined by the wall thickness of the pipe. The clearance may be $1/16$ or more, $1/8$ or more, $1/4$ or more, or even about $1/2$ or more of the wall thickness of the pipe. The clearance may be greater than the wall thickness of the pipe, about the same thickness as the pipe or about $3/4$ the thickness of the pipe or less. Preferably, the thickness of the clearance is about $1/2$ the wall thickness of the pipe or less. The clearance may vary around a circumference of the external guide, the internal guide, or both, when viewed in a cross section, due to sag of the pipe. For example, the pipe may contact the internal guide at 12 o'clock and have a large clearance at 6 o'clock or the pipe may contact the external guide at 6 o'clock and have a large clearance at 12 o'clock. The pipe may be supported by the internal guide, the external guide, or both only during start-up when one end of the pipe is unsupported. During running the pipe may be self-supporting on both ends so that the pipe forms a beam and the internal guide and external guide are located within the beam. In one example, the clearance between the inner wall of the external guide and the outer wall of the pipe may be 1 mm and the clearance between the outer wall of the internal guide and the inner wall of the pipe may be about 0.5 mm.

FIG. 1 illustrates a perspective view of an assembly 2. The assembly 2, as depicted, increases a diameter of a pipe 80. A diameter of the pipe 80 is increased as the pipe 80 extends along a mandrel 10 in the direction 100. The mandrel 10 includes a mandrel plug 14 that is located at an end of the mandrel 10, and a gap 16 is located between the mandrel 10 and the mandrel plug 14. The mandrel 10 is connected to an internal guide 50 that is located on an inside of the pipe 80. An external guide 30 extends around an outside of the pipe 80. The external guide 30 includes three segments 32 that are separated by external guide gaps 38. Each of the segments 32 include connection devices 34 that connect the external guide 30 to a mounting plate 36. Each of the segments 32 can move relative to each other.

Figure 2:
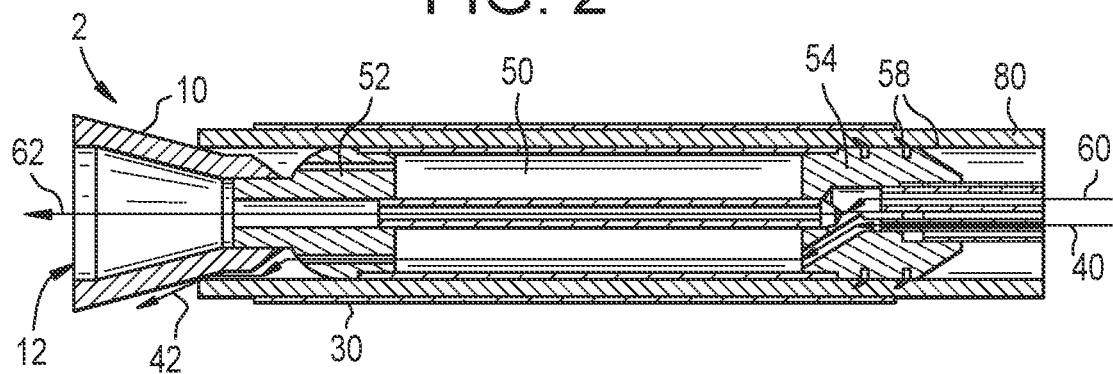
FIG. 2 illustrates a cross-sectional view of an assembly.

FIG. 2 illustrates a cross-sectional view of an assembly 2. The assembly 2 includes external guides 30 that extends around a pipe 80, and an internal guide 50 that is located within the pipe 80. The internal guide 50 includes an adapter 52 at an end closest to the mandrel 10 and an opposing end of the internal guide 50 includes a pressure plug 54. The pressure plug 54 includes a plurality of seals 58 that extend around the pressure plug 54 to form a seal with an inner diameter of the pipe 80. An internal tube 60 includes an internal fluid 62 that extends through the pipe 80, through the internal guide 50, and through a mandrel pipe 12 where the internal fluid exits the mandrel 10. An external tube 40 includes an external fluid 42 that extends through the pipe 80, through the pressure plug 54, around the external guide 30, and then between the pipe 80 and the mandrel 10.

Figure 3A:
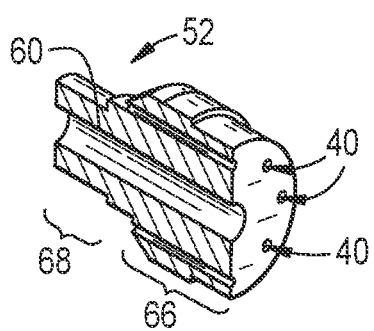
FIG. 3A illustrates a cross-sectional view of an adapter.

FIG. 3A illustrates a cross-sectional view of an adapter 52. The adapter 52 includes a plurality of external tubes 40 that are spaced apart and extend around a perimeter of the adapter 52. Each of the external tubes 40 allow fluid to extend through the adapter 52. An internal tube 60 extends through a center of the adapter 52 to allow fluid to flow though the adapter 52. The adapter 52 includes a body portion 66 that connects the adapter 52 to an external guide pipe (not shown) and a neck region 68 that connects the adapter 52 to a mandrel (not shown).

Figure 3B:
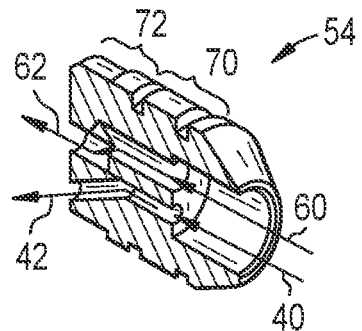
FIG. 3B illustrates a cross-sectional view of a pressure plug.

FIG. 3B illustrates a cross-sectional view of a pressure plug 54. The pressure plug 54 includes an internal tube 60 and an external tube 40 extending through. Arrows depict the flow of an external fluid 42 through the external tube 40 and internal fluid 62 through an internal tube 60. The pressure plug 54 includes a sealing region 70 that forms a seal with the pipe (not shown) and a connection region 72 that forms a connection with an external guide pipe (not shown).

Figure 4:
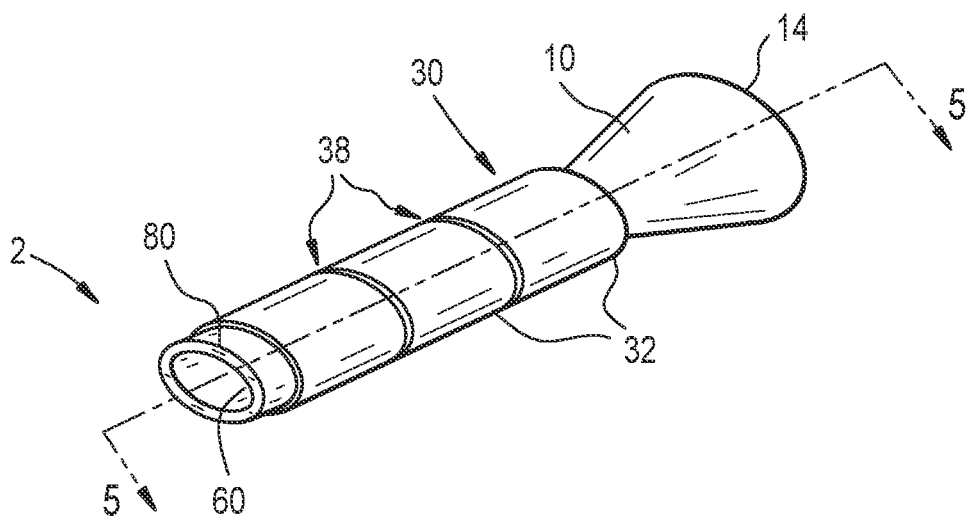
FIG. 4 illustrates a perspective view of a mandrel and assembly.

FIG. 4 illustrates a perspective view of an assembly 2 of the mandrel 10 proximate to an external guide 30 that includes a plurality of segments 32 with external guide gaps 38 between each of the segments 32. A pipe 80 extends through the external guide 30 and an internal guide 50 extends through the pipe 80. A mandrel plug 14 caps an end of the mandrel 10.

Figure 5:
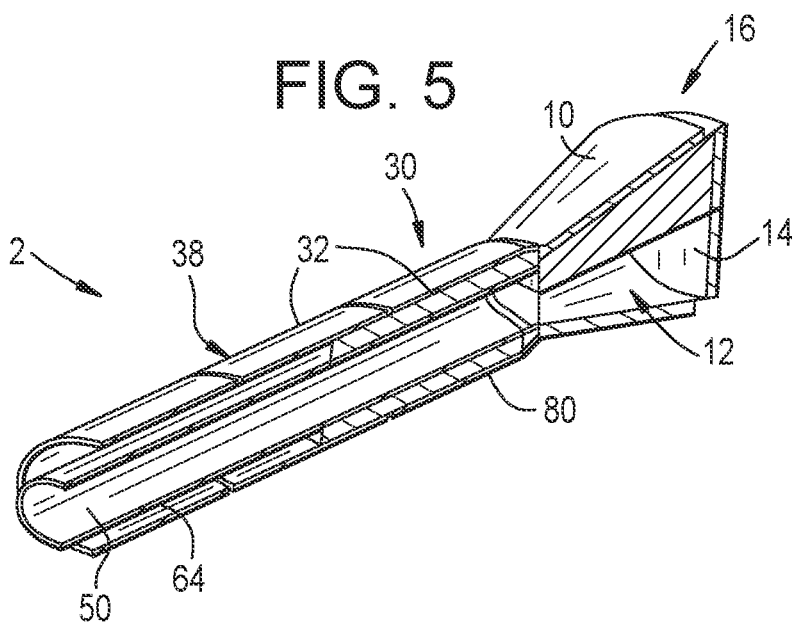
FIG. 5 illustrates a cross-sectional view of FIG. 4 along lines FIG. 5-FIG. 5.

FIG. 5 illustrates a cross-sectional view of the assembly 2 of FIG. 4 along line FIG. 5-FIG. 5. The assembly 2 includes an internal guide 50 inside of a pipe 80 and an external guide 30 on an outside of the pipe 80. The external guide 30 includes a plurality of segments 32 with external guide gaps 38 between each of the segments 32. The external guide 30 and internal guide 50 are located proximate to the mandrel 10. The internal guide 50 includes an external guide pipe 64 that is located proximate to the pipe 80 and can be moved into contact with the pipe 80. The mandrel 10 includes a mandrel pipe 12 on the inside of the mandrel 10. A mandrel plug 14 is located within the mandrel 10 and a gap 16 is located between the mandrel 10 and the mandrel plug 14.

Figure 6:
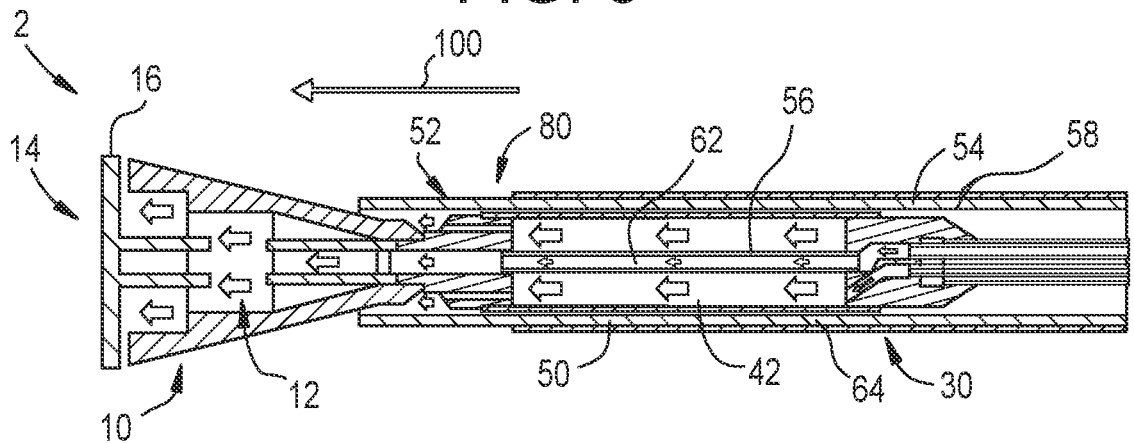
FIG. 6 illustrates a cross-sectional view of a mandrel and assembly and a flow of fluid through the mandrel and assembly.

FIG. 6 illustrates a cross-sectional view of the assembly 2 with fluid paths through the assembly 2. An internal fluid 62 begins outside of an internal guide 50 and extends in the direction of the arrows through the pressure plug 54 to the adapter 52 by way of an internal guide pipe 56, into the mandrel pipe 12 in the mandrel 10 and through the gap 16 between the mandrel 10 and the mandrel plug 14. An external fluid 42 extends through the pressure plug 54 through the internal guide 50, but outside of the internal guide pipe 56 so that the external fluid 42 applies a pressure to an inner diameter of the pipe 80. The external fluid 42 extends inside of the external guide pipe 64 that is connected to and extends between the adapter 52 and the pressure plug 54. The pressure plug 52 includes seals 58 that maintain the external fluid 42 within the internal guide 50. The external fluid 42 then flows into the adapter 52 and then between the pipe 80 and the mandrel 10 providing some lubrication for the pipe 80 to slide on the mandrel 10. An external guide 30 extends around an outer diameter of the pipe 80. The pipe 80 is moved over the mandrel 10 in the direction 100 so that the pipe 80 is expanded as the pipe 80 extends over the mandrel 10.

Figure 7A:
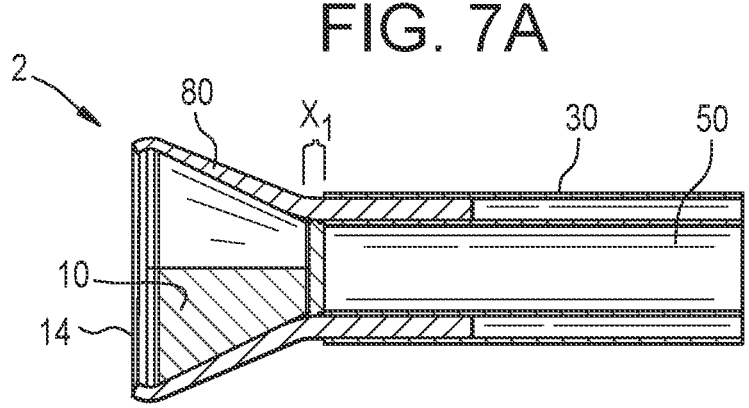
FIG. 7A illustrates a space between a mandrel and an external guide.

FIG. 7A illustrates a cross-sectional view of the assembly 2 during operation. A pipe 80 is moved between the external guide 30 and the internal guide 50 until the pipe 80 is moved over the mandrel 10. The size of the pipe 80 increases as the pipe 80 extends over the mandrel 10. The mandrel 10 includes a mandrel plug 14. A space with a length (X1) is located between the external guide 30 and the mandrel 10 and the internal guide 50 and the mandrel, and the length (X1) of the internal guide 50 and the external guide 30 is variable. The space allows the pipe 80 to transition over the mandrel 10 while still being supported by the external guide 30 and the internal guide 50.

Figure 7B:
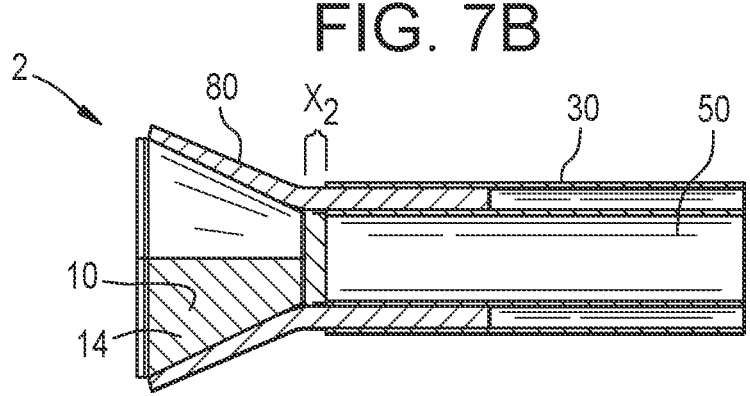
FIG. 7B illustrates a space between a mandrel and an internal guide.

FIG. 7B illustrates a cross-sectional view of the assembly 2 during operation. A pipe 80 is moved between the external guide 30 and the internal guide 50 until the pipe 80 is moved over the mandrel 10. The size of the pipe 80 increases as the pipe 80 extends over the mandrel 10. The mandrel 10 includes a mandrel plug 14. A space with a length (X2) is located between the internal guide 50 and the mandrel 10 and the external guide 30 and the mandrel 10. The space allows the pipe 80 to transition over the mandrel 10 while still being supported by the external guide 30 and the internal guide 50. The length (X1) of FIG. 7A is smaller than the length (X2) of FIG. 7B.

Figure 8:
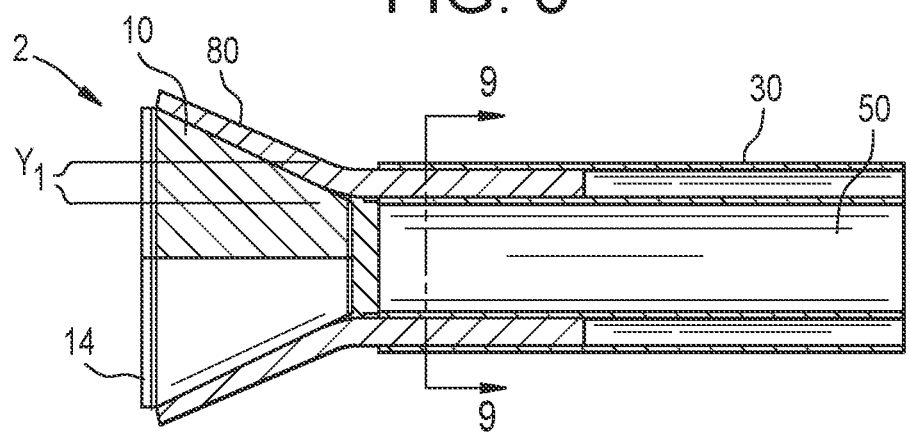
FIG. 8 illustrates a clearance between the pipe and the internal guide and external guide.

FIG. 8 illustrates a cross-sectional view of the assembly 2 during operation. A pipe 80 is moved between the external guide 30 and the internal guide 50 until the pipe 80 is moved over the mandrel 10. The size of the pipe 80 is increased as the pipe 80 extends over the mandrel 10. The mandrel 10 includes a mandrel plug 14. The pipe 80 extends between a space that extends between the external guide 30 and the internal guide 50. The space includes a length (Y1), and the length (Y1) is adjustable. The length (Y1) is equal to the wall thickness of the pipe 80 plus a clearance between the pipe 80 and the external guide 30, the internal guide 50, or both.

Figure 9:
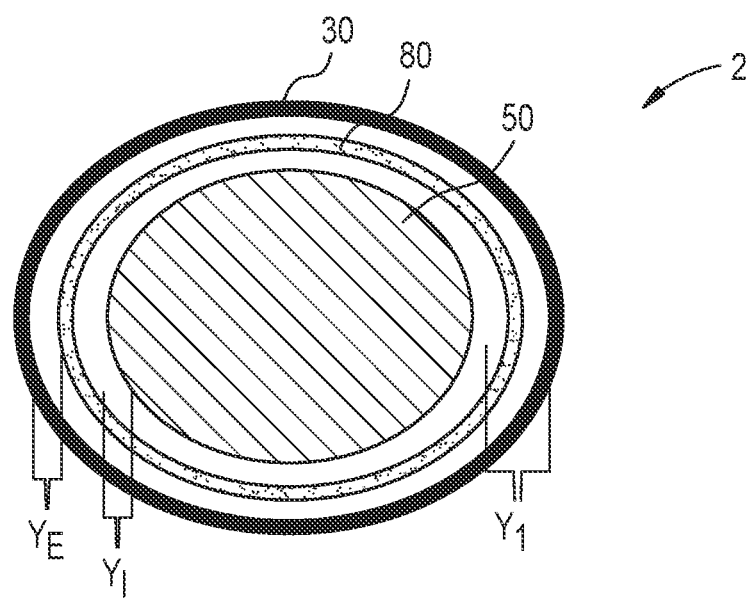
FIG. 9 illustrates a cross-sectional view of the clearances of FIG. 8 along lines FIG. 9-FIG. 9.

FIG. 9 illustrates a cross sectional view of the assembly 2 of FIG. 8 along line FIG. 9-FIG. 9. As shown, a total space with a length (Y1) is located between the outer wall of the internal guide 50 and an inner wall of the external guide 30 minus the wall thickness of the pipe 80. The total space is a sum of the internal gap (YI) and the external gap (YE), which do not include the thickness of the pipe 80.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Assembly
10 Mandrel
12 Mandrel pipe
14 Mandrel Plug
16 Gap
30 External Guide
32 Segments
34 Connection device
36 Mounting plate
38 External guide gap
40 External tube
42 External fluid
50 Internal guide
52 Adapter
54 Pressure plug
56 Internal guide pipe
58 Seal
60 Internal tube
62 Internal fluid
64 External guide pipe
66 Body portion (of adapter)
68 Neck region (of adapter)
70 Sealing region
72 Connection region
80 Pipe
100 Direction

We claim:

1. An apparatus comprising:
   a. a mandrel;
   b. an internal guide;
   c. an external guide extending around all or a portion of the internal guide and the external guide being concentric with the internal guide;
wherein a gap is located between the internal guide and the external guide, wherein the gap is equal to a thickness of a pipe to be moved through the apparatus plus a clearance between the pipe and the internal guide and between the pipe and the external guide; and
wherein the internal guide and the external guide each have an end that is located proximate to the mandrel and a space along the axis of the mandrel is located between the mandrel and the end of the internal guide proximate the mandrel and between the mandrel and the end of the external guide proximate to the mandrel.

2. The apparatus of claim 1, wherein the mandrel includes one or more mandrel pipes that extend through the mandrel, and wherein the mandrel includes a mandrel plug that blocks an end of the mandrel.

3. The apparatus of claim 2, wherein a gap is located between the mandrel plug and the mandrel so that fluid in the mandrel is expelled through the gap.

4. The apparatus of claim 3, wherein the external guide includes one or more segments.

5. The apparatus of claim 4, wherein the external guide includes a plurality of connection devices that connect the external guide to a mounting plate.

6. The apparatus of claim 5, wherein the internal guide includes an adapter located proximate to the mandrel and a pressure plug spaced apart from the mandrel and the adapter; and
wherein an internal guide pipe extends between and connects the adapter to the pressure plug.

7. The apparatus of claim 6, wherein the adapter, the pressure plug, or both includes one or more external tubes, one or more internal tubes, or both that extend through the adapter, the pressure plug, or both; and
wherein the one or more external tubes, the one or more internal tubes, or both extend through the adapter, the pressure plug, or both in a straight line or include one or more changes in direction.

8. The apparatus of claim 7, wherein the pressure plug, the adapter, or both include one or more seals that form a seal with the pipe so that fluid is retained within the internal guide; and
wherein the external guide includes external fluid and the external fluid provides pressure on an inside of the pipe.

9. The apparatus of claim 1, wherein the external guide includes one or more segments.

10. The apparatus of claim 9, wherein the one or more segments are a plurality of segments that are spaced apart and an external guide gap is located between each of the plurality of segments.

11. The apparatus of claim 1, wherein the external guide includes a plurality of connection devices that connect the external guide to a mounting plate.

12. The apparatus of claim 1, wherein the internal guide includes an adapter located proximate to the mandrel and a pressure plug spaced apart from the mandrel and the adapter; and
wherein an internal guide pipe extends between and connects the adapter to the pressure plug.

13. The apparatus of claim 12, wherein the adapter, the pressure plug, or both includes one or more external tubes, one or more internal tubes, or both that extend through the adapter, the pressure plug, or both; and
wherein the one or more external tubes, the one or more internal tubes, or both extend through the adapter, the pressure plug, or both in a straight line or include one or more changes in direction.

14. The apparatus of claim 12, wherein the pressure plug, the adapter, or both include one or more seals that form a seal with the pipe so that fluid is retained within the internal guide; and
wherein the external guide includes external fluid and the external fluid provides pressure on an inside of the pipe.

15. The apparatus of claim 12, wherein an external fluid extends through the adapter and between the pipe and the mandrel so that as the pipe extends along the mandrel the external fluid moves with the pipe along the mandrel.

16. The apparatus of claim 1, wherein the clearance is about 1 mm or more and about 10 mm or less.

17. The apparatus of claim 16, wherein the gap between the internal guide and the external guide is about 200 mm or less.

18. The apparatus of claim 1, wherein the gap between the internal guide and the external guide is equal to a wall thickness of the pipe plus a clearance between the pipe and the internal guide, the external guide, or both.

* * * * *